United States Patent
Shoshi et al.

(10) Patent No.: US 7,153,563 B2
(45) Date of Patent: Dec. 26, 2006

(54) HARD COAT FILM

(75) Inventors: Satoru Shoshi, Koshigaya (JP); Osamu Inaoka, Saitama (JP); Yoshitaka Takesako, Tatsuno (JP)

(73) Assignee: Lintec Corporation, Tokyo (JP)

( * ) Notice: Subject to any disclaimer, the term of this patent is extended or adjusted under 35 U.S.C. 154(b) by 144 days.

(21) Appl. No.: 10/634,054

(22) Filed: Aug. 4, 2003

(65) Prior Publication Data
US 2004/0071974 A1    Apr. 15, 2004

(30) Foreign Application Priority Data
Sep. 24, 2002   (JP)   ............... 2002-277695

(51) Int. Cl.
B32B 5/16       (2006.01)
B32B 27/38      (2006.01)
B32B 27/40      (2006.01)
B32B 27/06      (2006.01)
B32B 27/00      (2006.01)

(52) U.S. Cl. .................. 428/220; 428/323; 428/332; 428/337; 428/413; 428/423.1; 428/480; 428/500

(58) Field of Classification Search ............... 428/323, 428/500
See application file for complete search history.

(56) References Cited

U.S. PATENT DOCUMENTS 6,228,499 B1 *  5/2001  Nakauchi et al. ........... 428/412
6,893,731 B1 *  5/2005  Kausch ....................... 428/483
6,896,960 B1 *  5/2005  Shoshi et al. ............... 428/323

FOREIGN PATENT DOCUMENTS

JP    3-173949 A    7/1991
JP    2000-293895   10/2000

OTHER PUBLICATIONS

U.S. Appl. No. 11/005,865, filed Dec. 6, 2004.

* cited by examiner

Primary Examiner—Sheeba Ahmed
(74) Attorney, Agent, or Firm—Frishauf, Holtz, Goodman & Chick, P.C.

(57) ABSTRACT

A hard coat film comprising a substrate film and a hard coat layer disposed at least on one face of the substrate film, wherein the hard coat layer comprises 100 parts by weight of (A) a resin of an ionizing radiation curing type and 0.1 to 10 parts by weight of (B) a nonionic surfactant. The hard coat film is used for protection of surfaces such as the surface of touch panels and displays. Attachment of finger prints during input operations by fingers on the surfaces is suppressed and the attached finger prints can be easily wiped out. Scratch resistance and wear resistance of conventional hard coat films are retained.

17 Claims, 1 Drawing Sheet

HARD COAT FILM

BACKGROUND OF THE INVENTION

1. Field of the Invention

The present invention relates to a hard coat film. More particularly, the present invention relates to a hard coat film for protection of surfaces such as the surface of touch panels and displays, which suppresses attachment of finger prints on the surfaces during input operations by fingers and enables easy wiping out of the attached dirt such as finger prints while scratch resistance and abrasion resistance of conventional hard coat films are retained.

2. Description of Related Art

Transparent hard coat films have heretofore been used for protection of surfaces and prevention of glare and reflection in various image display apparatuses such as LCD (liquid crystal displays), touch panels, CRT (cathode ray tubes), PDP (plasma display panels), EL (electroluminescence displays) and optical disks.

Touch panels are used as the input apparatus for portable information terminals which are being widely used in recent years. The touch panel is an apparatus for inputting data by directly touching the surface of the display by a finger or a pen. About 90 percent of the entire touch panels are the touch panels of the resistance film type. The touch panel of the resistance film type has, in general, a structure in which a plastic substrate of the touching side which has a transparent electrically conductive (referred to as "conductive", hereinafter) thin film such as a film of indium oxide doped with tin (ITO) deposited on one face of a transparent plastic substrate and a transparent substrate of the display side which has a transparent conductive thin film such as an ITO film deposited on one face of a transparent substrate material such as a glass plate are arranged with an insulating spacer placed between the two substrates in a manner such that the transparent conductive thin films in the two substrates are faced to each other. For the input operation, the face for input by touching (the face opposite to the face having the transparent conductive thin film) of the plastic substrate of the touching side is pressed by a pen or a finger and the transparent conductive thin film of the plastic substrate of the touching side and the transparent conductive thin film of the display side are brought into contact with each other.

However, the touch panel of the resistance film type has a problem in that the surface of the touching side is damaged and the transparent conductive thin film in the plastic substrate (the substrate material film) of the touching side is abraded, has cracks or separated from the substrate after the transparent conductive thin film of the plastic substrate of the touching side and the transparent conductive film of the transparent substrate of the display side are repeatedly brought into contact with each other. To overcome the above problem, it is wide conducted that hard coat layers of a synthetic resin are disposed on the surface of the touching side and between the transparent plastic substrate and the transparent conductive thin film.

To provide the property of preventing attachment of dirt and removing the attached dirt, it is frequently conducted that a silicone-based compound or a fluorine-based compound is added to conventional hard coat films having a hard coat layer which is formed and supported on a substrate film by curing by heating or with an ionizing radiation. However, the highly water-repellent surface obtained above does not always suppress the attachment of finger prints and the attached finger prints are more clearly visible. The above technology is useful only for suppressing attachment of materials used in the everyday living such as foods and cosmetics and allowing easy removal of these materials. The conventional hard coat films have a drawback in that finger prints are attached on the films after input operations with fingers and the attached finger prints are not easily wiped out.

SUMMARY OF THE INVENTION

The present invention has an object of providing a hard coat film for protection of surfaces such as the surface of touch panels and displays, which suppresses attachment of finger prints on the surfaces during input operations by fingers and enables easy wiping out of the attached dirt such as finger prints while scratch resistance and abrasion resistance of conventional hard coat films are retained.

As the result of intensive studies by the present inventors, it was found that the above problems could be overcome when a hard coat layer comprised (A) a resin of the ionizing radiation curing type and (B) a nonionic surfactant. The present invention has been completed based on this knowledge.

The present invention provides:

(1) A hard coat film comprising a substrate film and a hard coat layer disposed at least on one face of the substrate film, wherein the hard coat layer comprises 100 parts by weight of (A) a resin of an ionizing radiation curing type and 0.1 to 10 parts by weight of (B) a nonionic surfactant;

(2) A hard coat film described in (1), wherein the nonionic surfactant of component (B) in the hard coat layer is a nonionic surfactant having a HLB of 2 to 15;

(3) A hard coat film described in any one of (1) and (2), wherein the nonionic surfactant of component (B) in the hard coat layer is an ester of a fatty acid; and (4) A hard coat film described in any one of (1) to (3), wherein the hard coat layer comprises fine particles having an average diameter of 0.1 to 10 μm in an amount of 0.1 to 20 parts by weight per 100 parts by weight of the resin of an ionizing radiation curing type of component (A).

Figure 1:
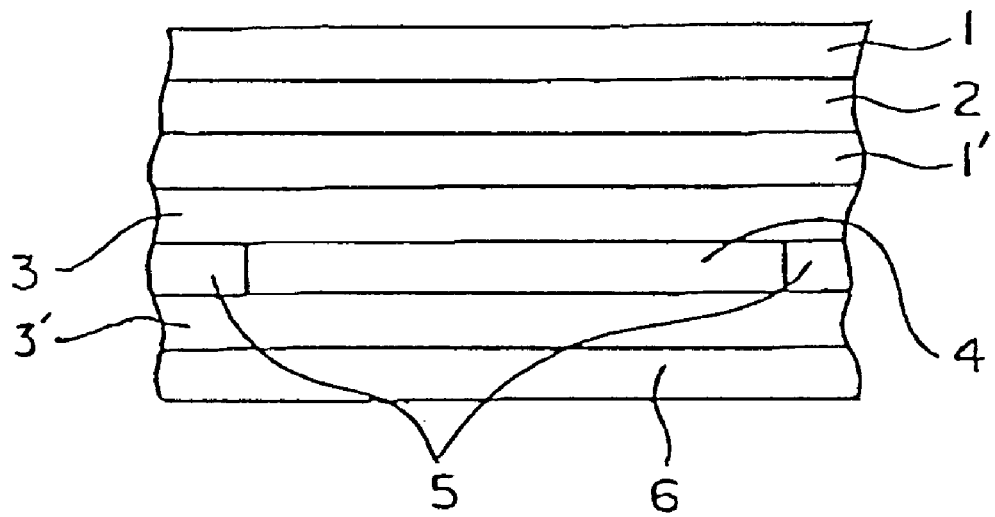
FIG. 1 shows a sectional view of a laminate portion on the surface of a touch panel of the resistance film type.

The numbers and characters in the figures have the meanings as listed in the following:

1 and 1': Hard coat layers
2: A substrate film
3 and 3': Transparent conductive thin films
4: An insulating space
5: An insulating spacer
6: A glass substrate
7: An adhesive layer
8: A substrate of an optical disk

DESCRIPTION OF THE PREFERRED EMBODIMENTS

The hard coat layer in the hard coat film of the present invention can be formed by applying a coating fluid containing components for forming the hard coat layer comprising (A) a resin of the ionizing radiation curing type and (B) a nonionic surfactant to one or both faces of a substrate film and curing the formed coating layer with an ionizing radiation.

The present invention will be described with reference to Figures in the following. The Figures show embodiments of the present invention and the present invention is not limited to the embodiments shown by the Figures.

FIG. 1 shows a sectional view of a laminate portion on the surface of a touch panel of the resistance film type. The hard coat film of the present invention can be used for the a laminate portion on the surface of a touch panel of the resistance film type. In the embodiment shown in FIG. 1, hard coat layers 1 and 1' are disposed on both faces of a substrate film 2. A hard coat film having the hard coat layer 1 disposed on one face of the substrate film 2 alone can be provided as another embodiment of the present invention.

A transparent conductive thin film of the touching side 3 and a transparent conductive thin film of the display side 3' are faced to each other via an insulating space 4 and an insulating spacer 5 disposed between the thin films. When the face for touching by a finger of the hard coat layer in the present invention is pressed by a pen or a finger, the transparent conductive thin film of the touching side 3 and the transparent conductive thin film of the display side 3' are brought into contact with each other by the pressure transferred through the substrate film 2 and the hard coat layer of the touching side 1' and the input operation can be conducted. The laminate portion on the surface of the touch panel of the resistance film type can be formed with the layers from the hard coat layer 1 on the face for touching by a finger to the glass substrate at the display side 6.

Figure 2:
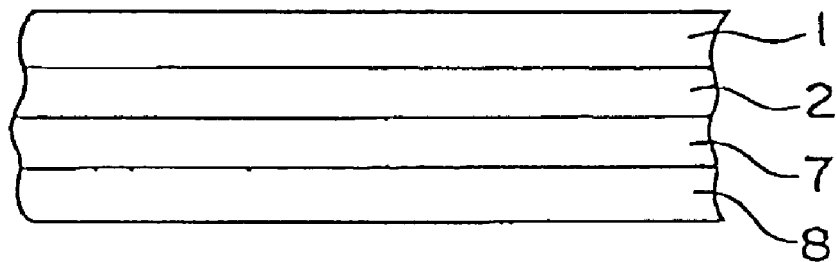
FIG. 2 shows a sectional view of the laminate portion on the surface of an optical disk.

FIG. 2 shows a sectional view of the laminate portion on the surface of an optical disk. The hard coat film of the present invention can be used for protection of the surface of optical disks such as CD and DVD.

In the embodiment shown in FIG. 2, a hard coat film having a hard coat layer 1 disposed on the surface of a substrate film 2 is attached to a substrate 8 of an optical disk via an adhesive layer 7.

As the resin of the ionizing radiation curing type used for forming the hard coat layers 1 and 1' of the hard coat film of the present invention, a conventional resin can be used without any restrictions. A photopolymerizable monomer or a photopolymerizable prepolymer can be used singly or in combination. A photopolymerization initiator may be added where desired.

Examples of the photopolymerizable monomer used for forming the hard coat layer 1 and 1' in the hard coat film of the present invention include polyfunctional acrylates such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol hydroxypivalate di(meth)acrylate, dicyclopentanyl di(meth)acrylate, dicyclopentenyl di(meth)acrylate modified with caprolactone, di(meth)acrylate of phosphoric acid modified with ethylene oxide, cyclohexyl di(meth)acrylate substituted with allyl group, isocyanurate di(meth)acrylate, trimethylolpropane tri(meth)acrylate, dipentaerythritol tri(meth)acrylate, dipentaerythritol tri(meth)acrylate modified with propionic acid, pentaerythritol tri(meth)acrylate, trimethylolpropane tri(meth)acrylate modified with propionic acid oxide, tris (acryloxyethyl) isocyanurate, dipentaerythritol penta(meth)acrylate modified with propionic acid, dipentaerythritol hexa (meth)acrylate and dipentaerythritol hexa(meth)acrylate modified with caprolactone. The above photopolymerizable monomers may be used singly or in combination of two or more. The photopolymerizable monomer may be used in combination with the photopolymerizable prepolymer.

The photopolymerizable prepolymer include prepolymers of the radical polymerization type and prepolymers of the cationic polymerization type. Examples of the prepolymer of the radical polymerization type include polyester acrylate-based prepolymers, epoxyacrylate-based prepolymers, urethane acrylate-based prepolymers and polyol acrylate-based prepolymers. The polyester acrylate-based prepolymer can be obtained, for example, by obtaining a polyester oligomer having hydroxyl groups at the ends by condensation of a polyfunctional carboxylic acid and a polyhydric alcohol, followed by esterification of the hydroxyl groups in the obtained oligomer with (meth)acrylic acid; or by obtaining an oligomer having hydroxyl groups at the ends by addition of an alkylene oxide to a polyfunctional carboxylic acid, followed by esterification of the hydroxyl groups of the obtained oligomer with (meth)acrylic acid. The epoxyacrylate-based prepolymer can be obtained, for example, by esterification of oxirane rings in an epoxy resin of a bisphenol type or a novolak type having a relatively low molecular weight by the reaction with (meth)acrylic acid. The urethane acrylate-based prepolymer can be obtained, for example, by obtaining a polyurethane oligomer by the reaction of a polyether polyol or a polyester polyol with a polyisocyanate, followed by esterification of the obtained oligomer with (meth)acrylic acid. The polyol acrylate-based prepolymer can be obtained, for example, by esterification of hydroxyl groups in a polyether polyol with (meth)acrylic acid. The above photo-polymerizable prepolymers may be used singly or in combination of two or more.

As the photopolymerizable prepolymer of the cationic polymerization type, in general, epoxy resins are used. Examples of the epoxy resin include compounds obtained by epoxidation of polyhydric phenols such as bisphenol resins and novolak resins with epichlorohydrin and compounds obtained by oxidation of linear olefin compounds and cyclic olefin compounds with peroxides.

Examples of the photopolymerization initiator for the photopolymerizable prepolymers and the photopolymerizable monomers of the radical polymerization type, which is used where desired for forming the hard coat layer 1 in the hard coat film of the present invention, include benzoin, benzoin methyl ether, benzoin ethyl ether, benzoin isopropyl ether, benzoin n-butyl ether, benzoin isobutyl ether, acetophenone, dimethylacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)-phenyl]-2-morpholinopropane-1-one, 4-(2-hydroxyethoxy)phenyl 2-(hydroxy-2-propyl)ketone, benzophenone, p-phenylbenzophenone, 4,4'-diethylaminobenzophenone, dichlorobenzophenone, 2-methyl-anthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and p-dimethylaminobenzoates.

Examples of the photopolymerization initiator for the photopolymerizable prepolymers of the cationic polymerization type include compounds composed of oniums such as aromatic sulfonium ions, aromatic oxosulfonium ions and aromatic iodonium ions and anions such as tetrafluoroborates, hexafluorophosphates, hexafluoroantimonates and hexafluoroarsenates. The above photopolymerization initiators may be used singly or in combination of two or more. The amount of the photopolymerization initiator is, in general, selected in the range of 0.2 to 10 parts by weight per 100 parts by weight of the photopolymerizable prepolymer and/or the photopolymerizable monomer.

The object of the present invention can be achieved by using the hard coat layer of the hard coat film of the present invention comprising (A) 100 parts by weight of (A) a resin of an ionizing radiation curing type and 0.1 to 10 parts by weight of (B) a nonionic surfactant. When the amount of the nonionic surfactant is less than 0.1 part by weight, the effect of adding the nonionic surfactant is not exhibited. When the amount exceeds 10 parts by weight, the properties of the hard coat layer in the hard coat film of the present invention deteriorate. Therefore, an amount outside the above range is not suitable as the amount of the nonionic surfactant used in the present invention. It is preferable that the amount of the nonionic surfactant is in the ragne of 0.5 to 8 parts by weight. Any conventional nonionic surfactants can be used as long as the above condition is satisfied. It is preferable that the nonionic surfactant has a HLB of 2 to 15 and, more preferably, a HLB of 4 to 14. When HLB is smaller than 2, the nonionic surfactant is excessively lipophilic. When HLB exceeds 15, the nonionic surfactant is excessively hydrophilic. Therefore, there is the possibility that finger prints are easily attached when HLB is outside the above range. The nonionic surfactant means, in general, surfactants which show no ionic properties when the surfactants are dissolved in water and are composed of a combination of a hydrophobic group (a lipophilic group) and a hydrophilic group similarly to other surfactants.

In the hydrophobic group (the lipophilic group), an aliphatic hydrocarbon group, an aromatic hydrocarbon group or an aromatic aliphatic hydrocarbon group having about 12 to 20 carbon atoms constitutes the main portion and a bonding group such as an ester group (—COO—), an ether group (—O—), an amide group (—CONH—), a thioether group (—S—), a thioamide group (—SONH—), a sulfoamide group (—$SO_2$NH—), a urea group (—NHCONH—) and a urethane group (—NHCOO—) or a linking group such as an acyl group (RCO—), an alkoxyl group (RO—), a heterocyclic group and various types of other linking groups is further introduced. Special organometallic hydrophobic groups (lipophilic groups) into which a metal such as Si, Ti, Sn, Ge and Zr is introduced may also be used. The paraffinic aliphatic groups have the greatest strength of the hydrophobic property (the lipophilic property) and the strength diminishes in the order of olefinic aliphatic groups, aromatic aliphatic groups and aromatic groups.

As the hydrophilic group, polyoxyethylene chains, hydroxyl group in polyhydric alcohols and groups having nitrogen are used. As the material of the hydrophilic group, polyethylene glycol, alkylene oxides such as ethylene oxide and propylene oxide, glycerol, sorbitane, sucrose and diethanolamine are frequently used.

Noinonic surfactants having various properties can be obtained by the combination of the hydrophobic groups (the lipophilic groups) and the hydrophilic groups described above.

As the nonionic surfactant used as component (B) in the hard coat layer in the present invention, esters of fatty acids are preferable.

As the ester of a fatty acid used in the present invention, esters of fatty acids obtained by condensation of monohydric alcohols and polyhydric alcohols with fatty acids can be used without any restrictions as long as the esters of fatty acids are suitable as the nonionic surfactant used in the present invention. Examples of the ester of a fatty acid include propylene glycol monostearate, propylene glycol monolaurate, diethylene glycol monostearate, diethylene glycol monolaurate, glycerol monostearate, sorbitane sesqui-oleate, sorbitane monooleate, sorbitane monostearate, sorbitane monopalmitate and sorbitane monolaurate.

As the ester of a fatty acid used in the present invention, esters of fatty acids to which a polyoxyalkylene group is added can be used. Conventional nonionic surfactants obtained by polyaddition of alkylene oxides to conventional esters of fatty acids can be used. As the alkylene oxide used for the polyaddition, ethylene oxide and propylene oxide are preferable. Compounds obtained by polyaddition of ethylene oxide are frequently used. Ethylene oxide and propylene oxide may be used for the polyaddition singly for homopolymerization or in combination for copolymerization.

As the ester of a fatty acid to which a polyoxyalkylene group is added, conventional esters of fatty acids to which a polyoxyalkylene group is added can be used as long as the esters of fatty acids are suitable as the nonionic surfactant of the present invention. Examples of the conventional ester of a fatty acid to which a polyoxyalkylene group is added include nonionic surfactants such as castor oil cured with polyoxyethylene, polyoxyethyleneglycerol monostearate, polyoxyethylene(4)sorbitane monostearate, polyoxyethylene(20)sorbitane monostearate, polyoxyethylene(4)sorbitane tristearate, polyoxyethylene(5)sorbitane monooleate, polyoxyethylene(5)sorbitane monooleate, polyoxyethylene(20)sorbitane triole ate, polyoxyethylene(4)sorbitane monolaurate, polyoxyethylene glycol 400 monooleate, polyoxyethylene glycol 400 monostearate, polyethylene glycol 400 monolaurate and polyoxyethylene(4)sorbitane monolaurate. Castor oil cured with polyoxyethylene and polyoxyethyleneglycerol monostearate are more preferable.

As the surfactant other than the ester of a fatty acid, polyoxyethylene cholesteryl ether and polyoxyethylenedecyl tetradecyl ether can be used.

HLB (the hydrophile-lipophile balance) is an important index showing the character of a surfactant and indicates the degree of the affinity to water or oil. HLB can be obtained in accordance with the following equation:

$$HLB=7+11.7 \, \mathrm{Log}(M_w/M_o)$$

wherein $M_w$ represents the molecular weight of the hydrophilic group, $M_o$ represents the molecular weight of the lipophilic group and $M=M_w+M_o$ represents the molecular weight of the surfactant.

For nonionic surfactants in which the hydrophilic group is limited to the polyoxyethylene chain or a polyhydric alcohol such as glycerol, glycol, sorbit and mannit, HLB can be obtained practically in accordance with the following equation:

$$HLB=20\times M_w/M=20\times(M-M_o)/M$$

Examples of the values of HLB for widely used surfactants are as follows: sorbitane trioleate: 1.8; sorbitane tristearate: 2.1; propylene glycol monolaurate: 4.5; sorbitane monopalmitate: 6.7; polyoxyethylene(4)sorbitane tristearate: 10.5; polyoxyethylene glycol 400 monooleate: 11.4; and polyoxyethylene(20)sorbitane monooleate: 15.0.

The coating fluid comprising the components for forming the hard coat layer in the present invention can be applied for coating after the components for forming the hard coat layer are diluted and dissolved with an organic solvent, where necessary. Conventional organic solvents can be used without any restrictions as long as the object of forming the hard coat layer 1 of the present invention on the substrate film 2 can be achieved. Examples of the organic solvent include aliphatic hydrocarbons such as hexane, heptane and cyclohexane; aromatic hydrocarbons such as toluene and xylene; halogenated hydrocarbons such as methylene chloride and ethylene chloride; alcohols such as methanol, ethanol, propanol and butanol; ketones such as acetone, methyl ethyl ketone, 2-pentanol and isophorone; esters such as ethyl acetate and butyl acetate; and cellosolve-based solvents such as ethyl cellosolve. The organic solvent may be used singly or in combination of two or more. The concentration and the viscosity of the coating fluid can be suitably selected in accordance with the object.

The process of coating for forming the hard coat layer 1 in the present invention is not particularly limited as long as the object of forming the hard coat layer in the present invention can be achieved and a conventional process such as the bar coating process, the knife coating process, the Mayer bar coating process, the roll coating process, the blade coating process, the die coating process and the gravure coating process can be used to form the coating layer.

As the ionizing radiation for curing the resin of the ionizing radiation curing type in the hard coat layer in the present invention, ionizing radiation having an energy quantum among electromagnetic waves and beams of charged particles can be used. Examples of the ionizing radiation include ultraviolet light and electron beams.

Ultraviolet light is preferable.

The ultraviolet light for forming the hard coat layer 1 in the present invention can be obtained from a high pressure mercury lamp, a fusion H lamp or a xenon lamp. The amount of the light used for the irradiation is, in general, in the range of 100 to 500 $mJ/cm^2$.

Electron beams for forming the hard coat layer 1 in the present invention can be obtained from an electron accelerator. The amount of the beams used for the irradiation is, in general, in the range of 150 to 350 kV. When the electron beams are used, the cured film can be obtained without adding a polymerization initiator.

As for the hardness of the hard coat layer 1 in the hard coat film of the present invention, the scratch resistance sufficient for the hard coat film can be provided when the pencil hardness is H or higher. It is preferable that the hard coat layer has a pencil hardness of 2H or higher so that the scratch resistance is more sufficiently exhibited. The thickness of the hard coat layer is selected in the range of 2 to 20 μm. When the thickness is smaller than 2 μm, the scratch resistance of the hard coat film is not sufficiently exhibited. When the thickness exceeds 20 μm, cracks are occasionally formed and the thickness is disadvantageous from the standpoint of production. It is preferable that the thickness of the hard coat layer is in the range of 2 to 15 μm.

A rough shape may be formed on the surface of the hard coat layer of the hard coat film to provide the anti-glare property. To form the rough shape, for example, after the resin composition of the ionizing radiation curing type is applied, a shape-forming film having a rough shape is laminated to the uncured layer formed by the application. After the uncured layer is cured by the heat curing treatment or the curing treatment with an ionizing radiation, the shape-forming film is removed.

The substrate film 2 used for the hard coat film can be suitably selected from conventional plastic films which are used as the substrate film in optical hard coat films.

Examples of the plastic film include films of polyesters such as polyethylene terephthalate, polybutylene terephthalate and polyethylene naphthalate, polyethylene films, polypropylene films, cellophane, diacetylcellulose films, triacetylcellulose films, acetylcellulose butyrate films, polyvinyl chloride films, polyvinylidene chloride films, polyvinyl alcohol films, ethylene-vinyl acetate copolymer films, polystyrene films, polycarbonate films, polymethylpentene films, polysulfone films, polyether ether ketone films, polyether sulfone films, polyether imide films, fluororesin films, polyamide films, acrylic resin films, polyurethane resin films, norbornene-based polymer films, cyclic olefin-based polymer films, cyclic conjugate diene-based polymer films and vinylalicyclic hydrocarbon polymer films.

Polyethylene terephthalate films, polycarbonate films and norbornene-based polymer films are preferable.

The thickness of the substrate film 2 is not particularly limited. The thickness is, in general, in the range of 20 to 300 μm and preferably in the range of 50 to 250 μm. When the thickness is smaller than 20 μm, the mechanical strength is insufficient and there is the possibility that the deformation by the input by a pen is excessively great and durability is insufficient when the hard coat film is used for a touch panel. When the thickness exceeds 300 μm, the pressure required to deform the film increases when the hard coat film is used for a touch panel. Therefore, a thickness outside the above range is not preferable.

One or both surfaces of the substrate film 2 may be subjected to the treatment with a primer or the surface treatment such as oxidation or formation of rough surfaces, where desired, so that adhesion with layers disposed on the surfaces is enhanced. Examples of the surface treatment by oxidation include the treatment by corona discharge, the treatment with chromic acid (a wet process), the treatment with flame, the treatment with heated air or irradiation with ultraviolet light in the presence of ozone. Examples of the treatment of formation of rough surfaces include the treatment by sand blasting and the treatment with a solvent. The surface treatment is suitably selected in accordance with the type of the substrate film. In general, the treatment by corona discharge is preferable from the standpoint of the effect and the operability.

It is preferable that the hard coat layer 1 comprises fine particles having an average diameter of 0.1 to 10 μm in an amount of 0.1 to 20 parts by weight per 100 parts by weight of the resin of the ionizing radiation curing type of component (A). The fine particles provides the anti-glare property. When the average diameter of the fine particles is smaller than 0.1μm, the effect of providing the anti-glare property is not exhibited. When the average diameter exceeds 10 μm, the physical properties of the hard coat layer deteriorate. It is more preferable that the average diameter of the fine particles is in the range of 0.5 to 8 μm. When the amount is less than 0.1 part by weight, the effect of providing the anti-glare property is not exhibited. When the amount exceeds 20 parts by weight, the physical properties of the hard coat layer deteriorate. It is more preferable that the fine particles are used in an amount of 0.5 to 15 parts by weight. The fine particles used in the hard coat layer in the present invention is not particularly limited and can be selected from fine particles exhibiting the effect of providing the anti-glare property. Among such fine particles, fine particles of silica gel are preferable. The fine particles of silica gel are constituted with $SiO_2$ as the main component. The surface of the fine particles may have hydroxyl group (silanol group) or may be modified with an organic group.

To summarize the advantages obtained by the invention, the hard coat film which is used for protection of surfaces such as the surfaces of touch panels and displays suppresses attachment of finger prints on the surfaces during input operations by fingers and enables easy wiping out of attached dirt such as finger prints while scratch resistance and wear resistance of conventional hard coat films are retained.

EXAMPLES

The present invention will be described more specifically with reference to examples in the following. However, the present invention is not limited to the examples.

Methods for Evaluation of the Properties of a Hard Coat Film (1) The total light transmittance (Tt) and the haze were measured in accordance with the method of Japanese Industrial Standard K7105 using a haze meter [manufactured by NIPPON DENSHOKU KOGYO Co., Ltd.; NDH2000].

(2) The contact angle was measured in accordance with the liquid drop method using a contact angle meter [manufactured by KYOWA KAIMEN KAGAKU Co., Ltd.; the type: "CA-D"]. In the liquid drop method, a liquid drop of purified water having a diameter of 2 mm was placed on the surface of a hard coat layer and the contact angle between the surface of the hard coat layer and the purified water was measured.

(3) The property for preventing attachment of finger prints was evaluated as follows: a hard coat film for the evaluation was placed on a black plate in a manner such that the hard coat layer was placed upwards; a finger was pressed slowly to the surface of the hard coat layer; and it was examined whether the attached finger print was visible or not. This examination was conducted by randomly chosen 10 persons. The property for preventing attachment of finger prints was evaluated by the number of persons whose finger print was not visible, the maximum point being 10. Although the tendency for attachment of finger print may be different depending on the person, the above test can be considered to be the test of the average tendency for attachment of finger prints since the ten persons were randomly chosen for the test.

(4) The property for wiping out finger prints was conducted when the attachment of the finger print was visible in the test of the property for preventing attachment of finger prints and evaluated as follows: 10 persons each wiped the surface having the visible finger print lightly 5 times with cotton stockinet cloth wrapped around a finger tip of the person; and the property for wiping out finger prints was evaluated by visual observation in accordance with the following criterion: A: the finger print was completely wiped out; B: the finger print slightly remained; C: the finger print remained. In Examples and Comparative Examples, the numbers of persons for classes of A, B and C among 10 persons are shown. When no attached finger print was visible in the test of the property for preventing attachment of finger prints, the property for wiping out finger prints was evaluated as A10.

(5) The pencil hardness was measured in accordance with the method of Japanese Industrial Standard K5400 using a hardness tester of a coating film by pencil scratch [manufactured by TOYO SEIKI SEISAKUSHO Co., Ltd.; the type: "NP"].

Example 1

To 100 parts by weight of a urethane acrylate-based hard coat material curable by ultraviolet light [manufactured by ARAKAWA KAGAKU KOGYO Co., Ltd.; the trade name: BEAMSET 575CB] (the concentration of solid components: 100%) as the resin of the ionizing radiation curing type, 1.5 parts by weight of castor oil cured with polyoxyethylene [manufactured by NIPPON EMULSION Co., Ltd.; EMALEX HC-20 (HLB: 9)] as the nonionic surfactant was added. The resultant mixture was diluted with a mixed solvent containing cyclohexane and ethylcellosolve in relative amounts of 1:1 in a manner such that the concentration of the solid components in the obtained entire mixture was 45% by weight and a coating fluid containing the components for forming a hard coat layer was prepared. The prepared coating fluid containing the components for forming a hard coat layer was applied to one face of a polyethylene terephthalate film [manufactured by TOYO BOSEKI Co., Ltd.; A4300] having a thickness of 188 µm as the substrate film using a Mayer bar No. 8. After the formed coating layer was dried at 70° C. for 1 minute, the dried coating layer was cured by irradiation of ultraviolet light in an amount of light of 250 mJ/cm$^2$ and a hard coat layer was formed. The cured hard coat layer had a thickness of 4.5 µm. The results of the evaluations of the obtained hard coat film are shown in Table 1 together with the results in Examples 2, 3, 4 and 5. In the test of the property for preventing attachment of finger prints in Example 1, 8 persons found no visible finger prints and all persons found no remaining finger prints in the test of the property for wiping out finger prints.

Example 2

A hard coat film was prepared in accordance with the same procedures as those conducted in Example 1 except that castor oil cured with polyoxyethylene [manufactured by NIPPON EMULSION Co., Ltd.; EMALEX HC-7 (HLB: 5)] was used as the nonionic surfactant. In the test of the property for preventing attachment of finger prints, 7 persons found no visible finger prints and all persons found no remaining finger prints in the test of the property for wiping out finger prints.

Example 3

A hard coat film was prepared in accordance with the same procedures as those conducted in Example 1 except that 3 parts by weight of fine particles of silica gel having an average diameter of 1.4 µm [manufactured by FUJI SILYSIA CHEMICAL, Ltd.; SYLYSIA 310] were further added. In the test of the property for preventing attachment of finger prints, all 10 persons found no visible finger prints and the property for wiping out finger prints was evaluated to be A10.

Example 4

A hard coat film was prepared in accordance with the same procedures as those conducted in Example 3 except that polyoxyethylene glycerol monostearate [manufactured by NIPPON EMULSION Co., Ltd.; EMALEX CS-10 (HLB: 9)] was used as the nonionic surfactant. In the test of the property for preventing attachment of finger prints, all 10 persons found no visible finger prints and the property for wiping out finger prints was evaluated to be A10.

Example 5

A hard coat film was prepared in accordance with the same procedures as those conducted in Example 3 except that a polyoxyethylene cholesteryl ether [manufactured by NIPPON EMULSION Co., Ltd.; EMALEX GL-15 (HLB: 13)] was used as the nonionic surfactant and a polyester acrylate-based hard coat material curable by ultraviolet light [manufactured by DAINICHI SEIKA KOGYO Co., Ltd.; the trade name:SEIKABEAM EXF-01L(NS)] was used in place of the hard coat material curable by ultraviolet light used in Example 3. In the test of the property for preventing attachment of finger prints, all 10 persons found no visible finger prints and the property for wiping out finger prints was evaluated to be A10.

TABLE 1

| Example | 1 | 2 | 3 | 4 | 5 |
|---|---|---|---|---|---|
| Tt (%) | 90.9 | 90.8 | 90.1 | 90.2 | 90.2 |
| Haze (%) | 0.9 | 0.9 | 3.9 | 4.7 | 4.5 |
| Contact angle (deg) | 71.1 | 70.4 | 69.5 | 70.0 | 69.2 |
| Property for preventing attachment of finger prints | 8 | 7 | 10 | 10 | 10 |
| Property for wiping out finger prints | A10 | A10 | A10 | A10 | A10 |
| Pencil hardness | 3 H | 3 H | 2 H | 2 H | 2 H |

Comparative Example 1

A hard coat film was prepared in accordance with the same procedures as those conducted in Example 1 except that 0.1 part by weight of a leveling agent having the dimethylsiloxane skeleton structure [manufactured by TORAY DOW CORNING SILICONE Co., Ltd.; SH28PA] was used in place of the nonionic surfactant. The results of evaluations of the obtained hard coat film are shown in Table 2 together with the results in Comparative Examples 2, 3 and 4.

In the test of the property for preventing attachment of finger prints, all 10 persons found visible finger prints. The evaluation in the test of the property for wiping out finger prints gave the poorest result of A0, B1 and C9. This expression means that 0 person evaluated as A, 1 person evaluated as B and 9 persons evaluated as C (similarly in the following Comparative Examples).

Comparative Example 2

A hard coat film was prepared in accordance with the same procedures as those conducted in Example 1 except that no nonionic surfactant was added. In the test of the property for preventing attachment of finger prints, 8 persons among 10 persons found visible finger prints. The result of the evaluation in the test of the property for wiping out finger prints was A0, B2 and C8.

Comparative Example 3

A hard coat film was prepared in accordance with the same procedures as those conducted in Example 3 except that a leveling agent having the dimethylsiloxane skeleton structure [manufactured by TORAY DOW CORNING SILICONE Co., Ltd.; SH28PA] was used in place of the nonionic surfactant.

In the test of the property for preventing attachment of finger prints, 7 persons among 10 persons found visible finger prints. The result of the evaluation in the test of the property for wiping out finger prints was A0, B3 and C7.

Comparative Example 4

A hard coat film was prepared in accordance with the same procedures as those conducted in Example 3 except that 0.1 part by weight of a fluorine-based additive [manufactured by NIPPON YUSHI Co., Ltd.; MODIPAR F-200] was used in place of the nonionic surfactant.

In the test of the property for preventing attachment of finger prints, 6 persons among 10 persons found visible finger prints. The result of the evaluation in the test of the property for wiping out finger prints was A0, B4 and C6.

TABLE 2

| | Comparative Example | | | |
|---|---|---|---|---|
| | 1 | 2 | 3 | 4 |
| Tt (%) | 90.9 | 90.5 | 90.2 | 90.5 |
| Haze (%) | 0.8 | 0.9 | 4.0 | 4.8 |
| Contact angle (deg) | 84.3 | 70.1 | 70.9 | 79.5 |
| Property for preventing attachment of finger prints | 0 | 2 | 3 | 4 |
| Property for wiping out finger prints | A0, B1, C9 | A0, B2, C8 | A0, B3, C7 | A0, B4, C6 |
| Pencil hardness | 3H | 3H | 2H | 2H |

What is claimed is:

1. A hard coat film comprising a substrate film having a thickness of 20 to 300 μm and a hard coat layer disposed on at least one face of the substrate film, wherein the hard coat layer has a thickness of 2 to 20 μm and comprises
    100 parts by weight of (A) a resin curable by an ionizing radiation, said resin curable by an ionizing radiation being at least one prepolymer polymerizable by a radical polymerization selected from the group consisting of a polyester acrylate prepolymer, an epoxyacrylate prepolymer, a urethane acrylate prepolymer and a polyol acrylate prepolymer, and
    0.1 to 10 parts by weight of (B) a nonionic surfactant having a HLB of 2 to 15, said nonionic surfactant being an ester of a fatty acid which is at least one compound selected from the group consisting of
    (a) an ester of a fatty acid selected from the group consisting of propylene glycol monostearate, propylene glycol monolaurate, diethylene glycol monostearate, diethylene glycol monolaurate, glycerol monostearate, sorbitane sesquioleate, sorbitane monooleate, sorbitane monostearate, sorbitane monopalmitate and sorbitane monolaurate, and
    (b) an ester of a fatty acid to which a polyoxyalkylene group is added, which is selected from the group consisting of castor oil cured with polyoxyethylene, polyoxyethyleneglycerol, monostearate, polyoxyethylene (4) sorbitane, monostearate, polyoxyethylene (20) sorbitane, monostearate, polyoxyethylene (4) sorbitane tristearate, polyoxyethylene (5) sorbitane monooleate, polyoxyethylene (5) sorbitane monooleate, polyoxyethylene (20) sorbitane trioleate, polyoxyethylene (4) sorbitane monolaurate, polyoxyethylene glycol 400 monooleate, polyoxyethylene glycol 400 monostearate, polyethylene glycol 400 monolaurate and polyoxyethylene (4) sorbitane monolaurate,
said hard coat layer being formed by applying a coating fluid comprising said components (A) and (B) to at least one face of the substrate film to form a coating layer and curing the coating layer with an ionizing radiation.

2. The hard coat film according to claim 1, wherein the hard coat layer comprises fine particles having an average diameter of 0.1 to 10 μm in an amount of 0.1 to 20 parts by weight per 100 parts by weight of the resin of curable by an ionizing radiation of component (A).

3. The hard coat film according to claim 1, wherein the ester of a fatty acid is at least one compound selected from the group consisting of (i) castor oil cured with polyoxyethylene and (ii) polyoxyethyleneglycerol monostearate.

4. The hard coat film according to claim 3, wherein the hard coat layer comprises fine particles having an average diameter of 0.1 to 10 μm in an amount of 0.1 to 20 parts by weight per 100 parts by weight of the resin curable by an ionizing radiation of component (A).

5. The hard coat film according to claim 3, wherein the nonionic surfactant (B) has a HLB of 4 to 14.

6. The hard coat film according to claim 5, wherein the hard coat layer comprises fine particles having an average diameter of 0.1 to 10 μm in an amount of 0.1 to 20 parts by weight per 100 parts by weight of the resin curable by an ionizing radiation of component (A).

7. The hard coat film according to claim 3, wherein the substrate film is selected from the group consisting of a polyethylene terephthalate film, a polycarbonate film and a norbornene polymer film.

8. The hard coat film according to claim 7, wherein the substrate film is a polyethylene terephthalate film.

9. The A hard coat film comprising a substrate film having a thickness of 20 to 300 μm and a hard coat layer disposed on at least one face of the substrate film, wherein the hard coat layer has a thickness of 2 to 20 μm and comprises 100 parts by weight of (A) a resin curable by an ionizing radiation and 0.1 to 10 parts by weight of (B) a nonionic surfactant having a HLB of 2 to 15, said hard coat layer being formed by applying a coating fluid comprising said components (A) and (B) to at least one face of the substrate film to form a coating layer and curing the coating layer with an ionizing radiation, wherein the nonionic surfactant of component (B) in the hard coat layer is at least one compound selected from the group consisting of polyoxyethylene cholesteryl ether and polyoxyethylenedecyl tetradecyl ether.

10. The hard coat film according to claim 9, wherein the hard coat layer comprises fine particles having an average diameter of 0.1 to 10 μm in an amount of 0.1 to 20 parts by weight per 100 parts by weight of the resin curable by an ionizing radiation of component (A).

11. The hard coat film according to claim 9, wherein the nonionic surfactant (B) has a HLB of 4 to 14.

12. The hard coat film according to claim 9, wherein the substrate film is selected from the group consisting of a polyethylene terephthalate film, a polycarbonate film and a norbornene polymer film.

13. The hard coat film according to claim 12, wherein the substrate film is a polyethylene terephthalate film.

14. The hard coat film according to claim 9, wherein the resin curable by an ionizing radiation is at least one substance selected from the group consisting of
(a) a photopolymerizable polyfunctional acrylate selected from the group consisting of 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol hydroxypivalate di(meth) acrylate, dicyclopentanyl di(meth) acrylate, dicyclopentenyl di(meth)acrylate modified with caprolactone, di(meth)acrylate of phosphoric acid modified with ethylene oxide, cyclohexyl di(meth)acrylate substituted with an allyl group, isocyanurate di(meth) acrylate, trimethyloipropane tri(meth) acrylate, dipentaerythritol tri (meth) acrylate, dipentaerythritol tri(meth)acrylate modified with propionic acid, pentaerythritol tri(meth) acrylate, trimethyloipropane tri(meth)acrylate modified with propionic acid oxide, tris (acryloxyethyl) isocyanurate, dipentaerythritol penta(meth)acrylate modified with propionic acid, dipentaerythritol hexa(meth) acrylate and dipentaerythritol hexa(meth)acrylate modified with caprolactone; and
(b) a photopolymerizable prepolymer selected from the group consisting of
(i) a prepolymer polymerizable by a radical polymerization selected from the group consisting of a polyester acrylate prepolymer, an epoxyacrylate prepolymer, a urethane acrylate prepolymer and a polyol acrylate prepolymer, and
(ii) a prepolymer polymerizable by a cationic polymerization comprising an epoxy resin selected from the group consisting of a compound obtained by epoxidation of a bisphenol resin with epichlorohydrin, a compound obtained by epoxidation of a novolak resin with epichlorohydrin, a compound obtained by oxidation of a linear olefin compound with a peroxide and a compound obtained by oxidation of a cyclic olefin compound with a peroxide.

15. The hard coat film according to claim 9, wherein said nonionic surfactant is polyoxyethylene cholesteryl ether.

16. The hard coat film according to claim 9, wherein said nonionic surfactant is polyoxyethylenedecyl tetradecyl ether.

17. The hard coat film according to claim 9, wherein the hard coat layer comprises fine particles having an average diameter of 0.1 to 10 μm in an amount of 0.1 to 20 parts by weight per 100 parts by weight of the resin curable by an ionizing radiation of component (A).

* * * * *